United States Patent
Kim et al.

(10) Patent No.: US 9,378,218 B2
(45) Date of Patent: Jun. 28, 2016

(54) APPARATUS AND METHOD FOR ENABLING CLIENTS TO PARTICIPATE IN DATA STORAGE IN DISTRIBUTED FILE SYSTEM

(75) Inventors: Chang-Soo Kim, Daejeon (KR); Hag-Young Kim, Daejeon (KR); Wan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 530 days.

(21) Appl. No.: 13/602,783

(22) Filed: Sep. 4, 2012

(65) Prior Publication Data

US 2013/0103708 A1    Apr. 25, 2013

(30) Foreign Application Priority Data

Oct. 24, 2011    (KR) .................. 10-2011-0109001
Jun. 22, 2012    (KR) .................. 10-2012-0067505

(51) Int. Cl.
G06F 17/30    (2006.01)

(52) U.S. Cl.
CPC .............................. G06F 17/30203 (2013.01)

(58) Field of Classification Search
CPC ..... G06F 17/30; G06F 9/00; G06F 17/30575; G06F 11/1076; G06F 17/30159; G06F 17/30203; G06F 17/30864; G06F 2211/104; G06F 3/061; G06F 3/0631; G06F 3/067; G06F 17/30067
See application file for complete search history.

(56) References Cited

U.S. PATENT DOCUMENTS

| | | | |
|---|---|---|---|
| 8,510,848 B1 * | 8/2013 | Zhao et al. .................. | 726/26 |
| 2009/0037680 A1 | 2/2009 | Colbert et al. | |
| 2009/0292705 A1 * | 11/2009 | McKenney et al. ............ | 707/8 |
| 2010/0161657 A1 | 6/2010 | Cha et al. | |
| 2010/0161897 A1 * | 6/2010 | Lee et al. .................... | 711/112 |
| 2010/0325199 A1 | 12/2010 | Park et al. | |
| 2011/0072208 A1 | 3/2011 | Gulati et al. | |
| 2011/0153606 A1 | 6/2011 | Kim et al. | |
| 2011/0289058 A1 * | 11/2011 | Anzai et al. ................. | 707/650 |

FOREIGN PATENT DOCUMENTS

| | | |
|---|---|---|
| KR | 10-2009-0065131 | 6/2009 |
| KR | 10-2010-0048130 | 5/2010 |
| KR | 10-2010-0070895 | 6/2010 |
| KR | 10-2010-0137323 | 12/2010 |
| KR | 10-2011-0070697 | 6/2011 |

* cited by examiner

*Primary Examiner* — Dinku Gebresenbet
(74) *Attorney, Agent, or Firm* — Staas & Halsey LLP

(57) ABSTRACT

Disclosed herein are an apparatus and method for enabling clients to participate in data storage in a distributed file system. The client device of a distributed file system according to the present invention includes a storage determination unit and a file reading unit. The storage determination unit determines whether first metadata information, including a global generation number of the chunk corresponding to a file to be read, has already been stored in the local storage. The file reading unit performs a read operation on the file using local data corresponding to the first metadata information if, as a result of the determination, it is determined that the first metadata information has already been stored.

19 Claims, 9 Drawing Sheets

APPARATUS AND METHOD FOR ENABLING CLIENTS TO PARTICIPATE IN DATA STORAGE IN DISTRIBUTED FILE SYSTEM

CROSS REFERENCE TO RELATED APPLICATIONS

This application claims the benefit of Korean Patent Application Nos. 10-2011-0109001 and 10-2012-0067505, filed on Oct. 24, 2011 and Jun. 22, 2012, respectively, which are hereby incorporated by reference in their entirety into this application.

BACKGROUND OF THE INVENTION

1. Technical Field

The present invention relates generally to a distributed file system and, more particularly, to a technology in which clients participate in fulfilling the function of a data repository in a distributed file system to achieve high-performance access in an environment in which the clients of the file system intensively access a specific data set.

2. Description of the Related Art

Recently, a plurality of Virtual Machines (VMs) is frequently hosted on a single physical server using virtualization technology. By hosting multiple VMs on a single physical server, the utilization of a system can be significantly increased. In addition, the function of VM's live migration can be utilized to balance system-wide workload and overcome difficulties in case of system failures.

For the live migration function of a Virtual Machine (VM), shared storage which is accessible to different server hosts while the hosts share a VM image is indispensible.

Methods of providing shared storage include a Storage Area Network (SAN), Network Attached Storage (NAS), an Internet Small Computer System Interface (iSCSI) storage, and a distributed file system.

The conventional methods of providing shared storage, such as an SAN, NAS and an iSCSI, however, have many problems in terms of storage scalability and easy management. Furthermore, the methods are problematic in that the performance of a client's access to storage may be lowered because access to the storage is concentrated in proportion to the increasing number of clients.

Meanwhile, a distributed file system configured to provide an integrated file system to users and to be sharable among several users by connecting a plurality of computers, each including storage, via a network in various recent Internet environments has recently been being used.

A distributed file system is advantageous in that it provides high scalability by allowing the number of servers participating in the distributed file system to be increased depending on the circumstances, thereby enabling the size of the file system to be easily extended. Furthermore, the distributed file system may provide high availability because it can use a replica of another data storage server when a specific data storage server fails in such a way as to redundantly store replicas of file data in different data storage servers. Furthermore, the distributed file system can improve performance by distributing the read requests of several clients over several storage servers because there are several replicas.

Furthermore, various and improved techniques that use a distributed file system have been introduced, such as a method of moving a VM disk from a piece of physical storage to another piece of physical storage in the state in which a VM is running, which is disclosed in U.S. Patent Application Publication No. 2009/0037680.

This distributed file system is also problematic in that the performance of a client's access to storage is deteriorated in proportion to an increase in the number of clients. The problems in the virtual environment have a fatal limitation that causes the important applications of enterprises, such as database systems, to include a plurality of file systems and then each of the file systems to support only a limited number of clients, or that prevents execution in the virtual environment.

SUMMARY OF THE INVENTION

Accordingly, the present invention has been made keeping in mind the above problems occurring in the prior art, and an object of the present invention is to enable a client to participate in fulfilling the function of a data repository in a distributed file system, thereby enabling a client's access to the file system to have a local disk access effect.

Another object of the present invention is to enable a client to participate in fulfilling the function of a data repository in a distributed file system, thereby preventing a degradation in the performance of access to storage occurring when the number of clients in a distributed and shared file system increases.

Still another object of the present invention is to enable a client to participate in fulfilling the function of a data repository in a distributed file system, while enabling a client to access the correct chunk by keeping track of the change history of a chunk using the generation number of the chunk.

In order to accomplish the above objects, the present invention provides a client device of a distributed file system, including a storage determination unit configured to determine whether first metadata information, including a global generation number of a chunk corresponding to a file to be read, has already been stored within the client device; and a file reading unit configured to perform a read operation on the file using local data corresponding to the first metadata information if, as a result of the determination, it is determined that the first metadata information has already been stored.

The client device may further include a metadata reception unit configured to receive second metadata information comprising the global generation number of the chunk from the metadata server(s) and store the second metadata information in local storage. In this case, the file reading unit performs the read operation on the file by receiving chunk data from a data server corresponding to the second metadata information and storing the chunk in the local storage.

Each of the first metadata information and the second metadata information may include file attribute information comprising one or more of a size of the file, a size of the chunk, a number of replicas of the file, an owner of the file, and rights to access the file; and chunk information about the chunk that belongs to the file.

The chunk information may include a chunk ID, the global generation number, and a chunk storage server list; the chunk storage server list may include a number of entries, while each entry has a data server ID of a data server storing the chunk, and a chunk location ID in the data server, and a generation number of the chunk; and the generation number may be increased by 1 every time the chunk corresponding to the generation number is changed.

The global generation number may correspond to a largest of generation numbers corresponding to the data servers.

The client device may further include a change determination unit configured to compare the global generation number included in the first metadata information with the global generation number included in the second metadata information and to determine whether the chunk has been changed based on results of the comparison.

If, as a result of the comparison, it is determined that the global generation number included in the first metadata information is identical with the global generation number included in the second metadata information, the file reading unit may perform the read operation on the file using the local data corresponding to the first metadata information; and if, as a result of the comparison, it is determined that the global generation number included in the first metadata information is different from the global generation number included in the second metadata information, the file reading unit may determine that the chunk has been changed, receives the chunk data from one of the data servers corresponding to the second metadata information, and then perform the read operation on the file using the received chunk data.

The data server corresponding to the second metadata information may have the generation number identical with the global generation number included in the second metadata information.

The client device may further include a data writing unit configured to write data to a local chunk; a local global number increasing unit configured to increase the global generation number for the local chunk, corresponding to the data, by 1 and to store the increased global generation number; a global number increasing request unit configured to request a metadata server to increase the global generation number of the metadata information, corresponding to the data, by 1; and a data replication unit configured to perform data replication corresponding to the write operation.

The client device may further include a chunk necessity determination unit configured to determine whether a new chunk is necessary before writing the data; a chunk allocation request unit configured to request the metadata server to allocate a chunk if, as a result of the determination, it is determined that the new chunk is necessary; and a chunk allocation unit configured to receive information about results of the allocation of the new chunk and metadata information corresponding to the allocated chunk from the metadata server, to allocate the new chunk to the local storage, and to store the received metadata information.

In order to accomplish the above objects, the present invention provides a metadata server device of a distributed file system, including a presence determination unit configured to determine whether metadata information for a chunk corresponding to a file on which a read was requested is present; and a metadata transmission unit configured to send file attribute information and chunk information included in the metadata information if, as a result of the determination, it is determined that metadata information is present; wherein the file attribute information comprises one or more of a size of the file, a size of the chunk, a number of replicas of the file, an owner of the file, and rights to access the file.

The metadata server device may further include an error transmission unit configured to send an error if, as a result of the determination, it is determined that no metadata information is present; and a lock setting unit configured to set a lock for the file attribute information and the chunk; wherein the metadata transmission unit accesses the file attribute information and the chunk information only when the lock has been set.

The metadata server device may correspond to a metadata server cluster including a plurality of the metadata servers; and each of the plurality of metadata servers may manage only metadata information allocated thereto.

In order to accomplish the above objects, the present invention provides a method of a client of a distributed file system reading a file, including determining whether first metadata information, comprising a global generation number of a chunk corresponding to the file to be read, has already been stored; and performing a read operation on the file using local data corresponding to the first metadata information if, as a result of the determination, it is determined that the first metadata information has already been stored.

The method may further include receiving second metadata information comprising the global generation number of the chunk from the metadata server device; and storing the second metadata information in local storage as a first metadata information; wherein the performing the read operation on the file comprises receiving chunk data from a data server corresponding to the second metadata information and performing the read operation on the file using the received chunk data.

Each of the first metadata information and the second metadata information may include file attribute information comprising one or more of a size of the file, a size of the chunk, a number of replicas of the file, an owner of the file, and rights to access the file; and the chunk information of the chunk that belongs to the file.

In order to accomplish the above objects, the present invention provides a method of a metadata server device of a distributed file system processing a read request, including determining whether metadata information for a chunk corresponding to a file on which a read operation was requested is present; and sending file attribute information and chunk information included in the metadata information if, as a result of the determination, it is determined that metadata information is present; wherein the file attribute information comprises one or more of a size of the file, a size of the chunk, a number of replicas of the file, an owner of the file, and rights to access the file.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
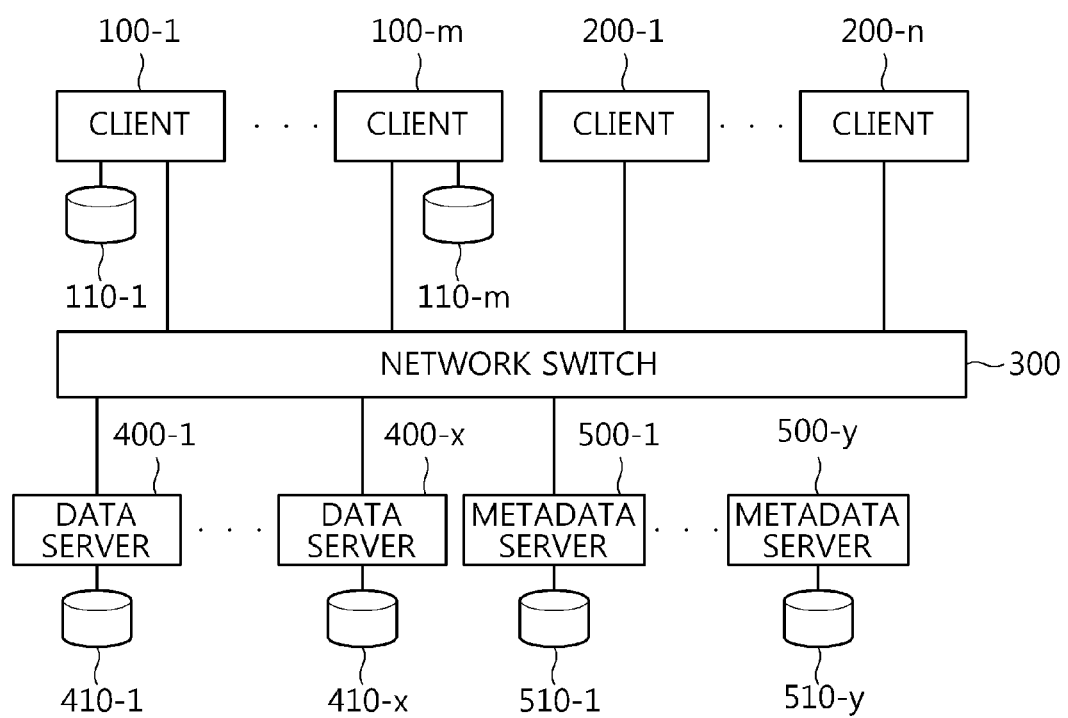
FIG. 1 is a diagram showing the configuration of a client participation-type distributed file system according to an embodiment of the present invention.

The present invention will be described in detail below with reference to the accompanying drawings. Repeated descriptions and descriptions of known functions and constructions which have been deemed to make the gist of the present invention unnecessarily vague will be omitted below. The embodiments of the present invention are provided in order to fully describe the present invention to a person having ordinary skill in the art. Accordingly, the shapes, sizes, etc. of elements in the drawings may be exaggerated to make the description clear.

Preferred embodiments of the present invention will be described in detail below with reference to the accompanying drawings.

FIG. 1 shows the configuration of a client participation-type distributed file system according to an embodiment of the present invention.

Referring to FIG. 1, the client participation-type distributed file system according to the embodiment of the present invention includes participation-type clients 100-1, . . . , and 100-$m$, non-participation-type clients 200-1, . . . , and 200-$n$, data servers 400-1, . . . , and 400-$x$, and metadata servers 500-1, . . . , and 500-$y$.

The participation-type clients 100-1, . . . , and 100-$m$, the non-participation-type clients 200-1, . . . , and 200-$n$, the data servers 400-1, . . . , and 400-$x$, and the metadata servers 500-1, . . . , and 500-$y$ are interconnected via a network switch 300.

The participation-type clients 100-1, . . . , and 100-$m$ include respective pieces of storage 110-1, . . . , and 110-$m$, partially participate in the data storage of the distributed file system, access the file metadata of the metadata servers 500-1, . . . , and 500-$y$, and directly access the file data of the data servers 400-1, . . . , and 400-$x$.

Furthermore, the participation-type clients 100-1, . . . , and 100-$m$ store the accessed metadata information and file data in their local storage 110-1, . . . , and 110-$m$ and process access to data identical to the stored data in local storage in the future, thus partially functioning as data servers.

The non-participation-type clients 200-1, . . . , and 200-$n$ are common clients that do not participate in the data storage of the distributed file system, and access the file metadata of the metadata servers 500-1, . . . , and 500-$y$ and also directly access the file data of the data servers 400-1, . . . , and 400-$x$, like the participation-type clients 100-1, . . . , and 100-$m$.

The metadata servers 500-1, . . . , and 500-$y$ include respective pieces of storage 510-1, . . . , and 510-$y$, and maintain metadata (i.e., metadata information) for all the files of a file system. The metadata includes the attributes of each of files and location information indicative of one of the data servers 400-1, . . . , and 400-$x$ on which each of the chunks forming each of the files is stored.

The attributes of each file may include the size of the file, the size of each chunk (or each block), the number of replicas, rights to access the file, and the owner of the file.

The metadata further includes the generation number of a chunk that is used to keep track of the change history of each of the chunks corresponding to each of files and to perform control so that a client who attempts to access a chunk can access the correct chunk.

The generation number of a chunk is modified when the chunk is changed. For example, the generation number of a chunk may be increased by '1' every time the chunk is changed.

The participation-type clients 100-1, . . . , and 100-$m$ become aware that a specific chunk has been changed using the generation number of the specific chunk stored in the local storage and the generation number of the specific chunk stored in the metadata servers 500-1, . . . , and 500-$y$.

Furthermore, when a new chunk needs to be generated, the metadata servers 500-1, . . . , and 500-$y$ select a main data server in which a generated chunk will be stored and a replica data server(s) to which data replication will be performed by the main data server.

The data servers 400-1, . . . , and 400-$x$ include respective pieces of storage 410-1, . . . , and 410-$x$, store and manage the chunks of corresponding files, and process data access requests from the clients 100-1, . . . , and 100-$m$, 200-1, . . . , and 200-$n$.

Figure 2:
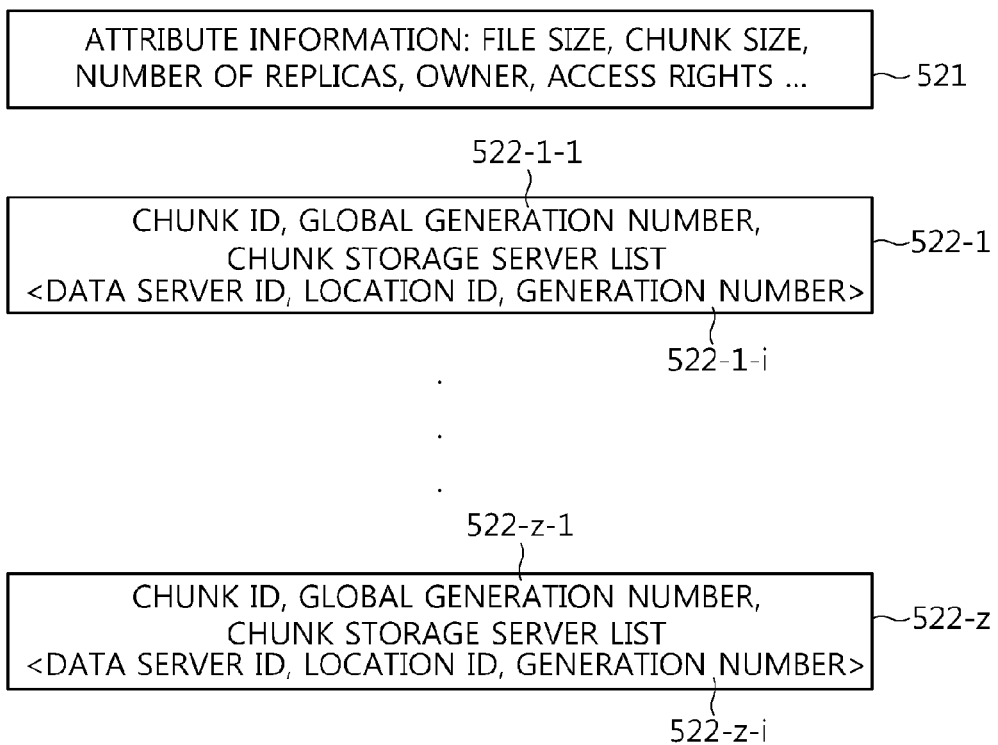
FIG. 2 is a diagram showing metadata information according to an embodiment of the present invention.

FIG. 2 is a diagram showing metadata information according to an embodiment of the present invention.

Referring to FIG. 2, metadata information 520 that is maintained and managed in the metadata server for a file that is maintained in the file system includes file attribute information 521 and one or more pieces of chunk information 522-1, . . . , and 522-$z$.

The file attribute information 521 may include the size of a file, the size of each chunk, the number of replicas, the owner of the file, and rights to access the file.

The chunk information 522-1, . . . , and 522-$z$ is information about respective chunks that belong to a file. A plurality of pieces of chunk information may be provided depending on the number of chunks z that belong to a file.

Each of the plurality of pieces of chunk information 522-1, . . . , and 522-$z$ includes a chunk ID, the global generation number 522-1-1, . . . , or 522-$z$-1 of a corresponding chunk, and a list of data servers in which the chunk will be stored.

The list of data servers (chunk storage server list) in which the chunk will be stored includes a data server ID, a chunk location ID within the data server, and the generation number 522-1-$i$, . . . , or 522-$z$-$i$ of the chunk stored in the data server.

Each of the generation numbers 522-1-$i$, . . . , and 522-$z$-$i$ of the chunks stored in the data servers is increased by 1 when a corresponding chunk is modified in the data server. For example, if a main data server has modified a specific chunk in response to a write request but a replica data server has not modified the specific chunk, the generation number of the main data server is 1 greater than the generation number of the replica data server.

The global generation numbers 522-1-1, . . . , and 522-$z$-1 of chunks are assigned the largest of the generation numbers corresponding to data servers (including participation-type clients) included in a chunk storage server list. The global generation number may be used to keep track of the context in which a write has not yet been incorporated into data server after a participation-type client has performed a write on local storage.

All the generation numbers are initialized to 0 when a file is first generated.

For convenience of description, the following description will be given on the assumption that there is only one metadata server. For the purposes of scalability and improved performance, the metadata server may be extended to a metadata server cluster including a plurality of metadata servers. If the metadata server is configured as a cluster, information that is shared by all metadata servers is necessary in order to determine the metadata server that is responsible for specific metadata. This shared information may be obtained by performing a calculation using a hash function, or may be obtained in such a way that all the metadata servers share the shared information. Each of the metadata servers within the metadata server cluster manages only metadata allocated thereto for management.

The read and write of a file will be described in detail below.

Figure 3:
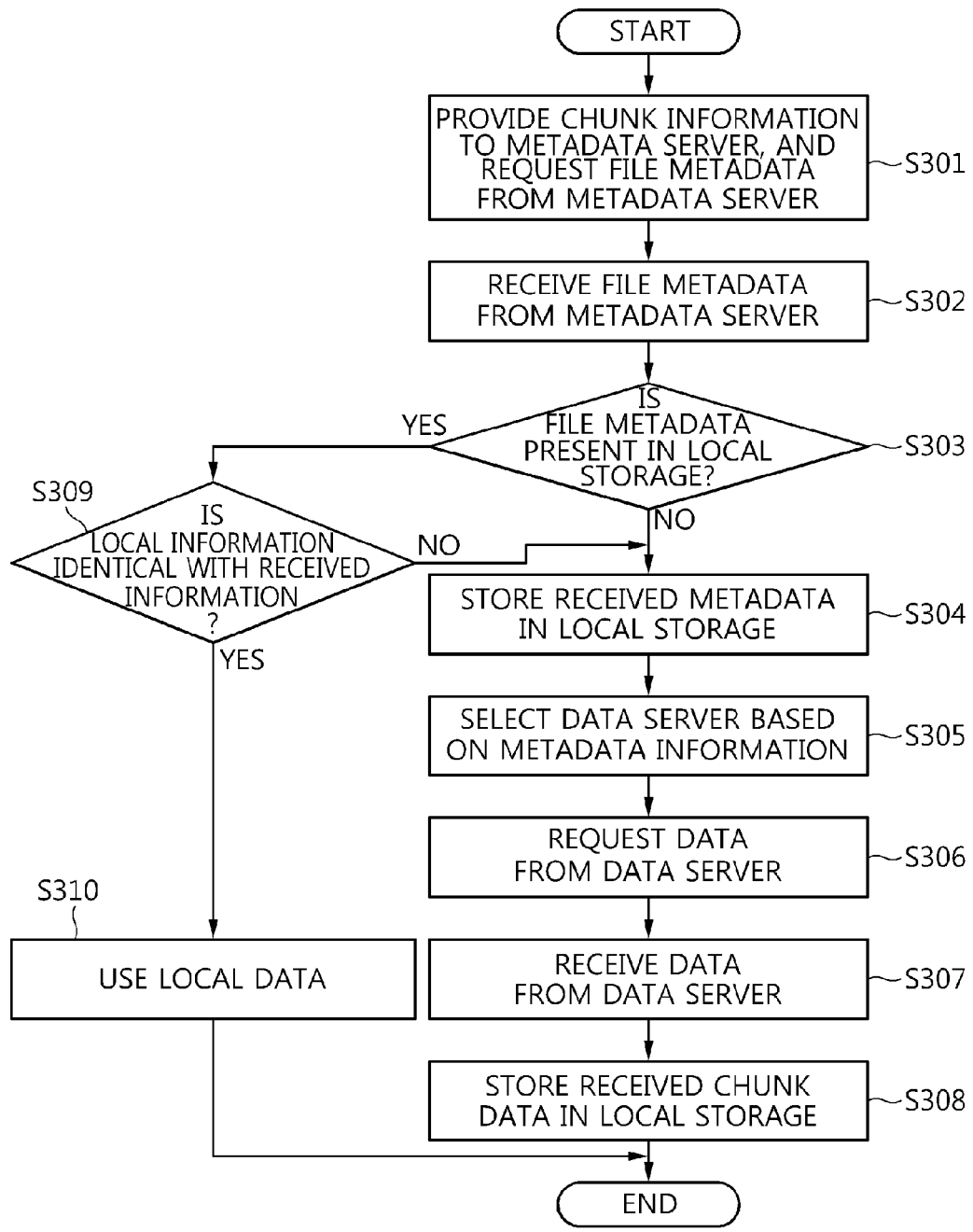
FIG. 3 is a flowchart illustrating a method by which a participation-type client of the distributed file system reads a file according to an embodiment of the present invention.

FIG. 3 is a flowchart illustrating a method by which a participation-type client of the distributed file system reads a file according to an embodiment of the present invention.

Referring to FIG. 3, the participation-type client of the distributed file system according to an embodiment of the present invention provides the chunk number of a file to be read to the metadata server in order for the file to be read, and requests the metadata information for the file from the metadata server at step S301.

As a result of the response to the request at step S301, the participation-type client receives the metadata information (i.e., file attribute information and the chunk information of a corresponding chunk) of the file from the metadata server at step S302.

After receiving the metadata information, the participation-type client determines whether the metadata information has been previously stored in its local storage at step S303.

If, as a result of the determination at step S303, it is determined that the metadata information has not been stored in the local storage, this means that the requested chunk of the file is first read, and thus the participation-type client stores the received metadata information (i.e., the file attribute information and the chunk information of the chunk) in the local storage at step S304.

After storing the metadata information in the local storage, the participation-type client selects a data server from which chunk data will be read using the received metadata information at step S305, requests the chunk data from the selected data server at step S306, and then receives the chunk data from the selected data server at step S307. After receiving the chunk data, the participation-type client stores the received chunk data in the local storage and performs a file read operation using the stored chunk data at step S308.

More specifically, the participation-type client selects only a data server that has a generation number that is the same as the global generation number of the chunk at step S305.

Here, the participation-type client may check whether the read was successful based on status information transferred from the data server after step S307 has been completed. If, as a result of the checking, it is determined that the read was unsuccessful, the participation-type client may return to step S305, in which the participation-type client selects another data server and then performs the data request and reception operations.

For convenience of description, only the case where the reception of data is successful will be described below.

If, as a result of the determination at step S303, it is determined that the metadata information has already been stored in the local storage, the participation-type client checks whether the metadata information stored in the local storage is identical with the received metadata information at step S309.

Here, whether the metadata information stored in the local storage is identical with the received metadata information may be determined by comparing only the global generation number of the chunk included in the metadata information stored in the local storage with the global generation number of the chunk included in the received metadata without comparing all of the metadata information stored in the local storage with all of the received metadata information.

If, as a result of the comparison, the global generation number of the chunk included in the metadata information stored in the local storage is different from the global generation number of the chunk included in the received metadata, this means that the chunk has been changed by another client, and thus the participation-type client stores the received metadata information in the local storage at step S304.

The process subsequent to step S303 is the same as that performed when the metadata is not present in the local storage.

If, as a result of the comparison, it is determined that the global generation number of the chunk included in the metadata information stored in the local storage is identical with the global generation number of the chunk included in the received metadata, this means that the file has already been stored in the participation-type client, and thus the participation-type client performs a read operation on the file using the data stored in the local storage at step S310.

Figure 4:
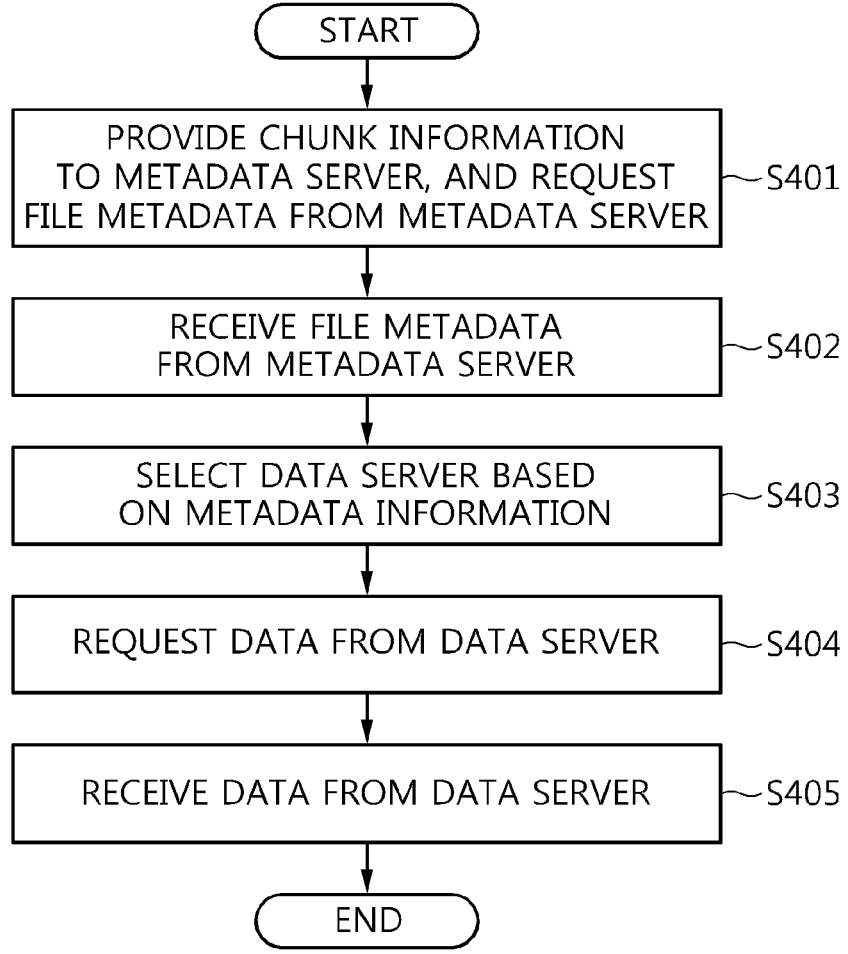
FIG. 4 is a flowchart illustrating a method by which a non-participation-type client of the distributed file system reads a file according to an embodiment of the present invention.

FIG. 4 is a flowchart illustrating a method by which a non-participation-type client of the distributed file system reads a file according to an embodiment of the present invention.

Referring to FIG. 4, the non-participation-type client of the distributed file system according to an embodiment of the present invention provides the chunk number of a file to be read to the metadata server in order to read the file, and requests the metadata information for the file from the metadata server at step S401.

As a result of the response to the request at step S401, the non-participation-type client receives the metadata information (i.e., file attribute information and the chunk information of a chunk) of the file from the metadata server at step S402.

After receiving the metadata information, the non-participation-type client selects a data server from which chunk data will be read using the received metadata information at step S403, requests the chunk data from the selected data server at step S404, receives the chunk data from the data server, and then performs a file read operation using the received chunk data at step S405.

In the file read methods described with reference to FIGS. 3 and 4, the client may utilize temporary caching using memory. In this case, the method of reading a file described with reference to FIG. 4 may be performed like the method of reading a file described with reference to FIG. 3.

Figure 5:
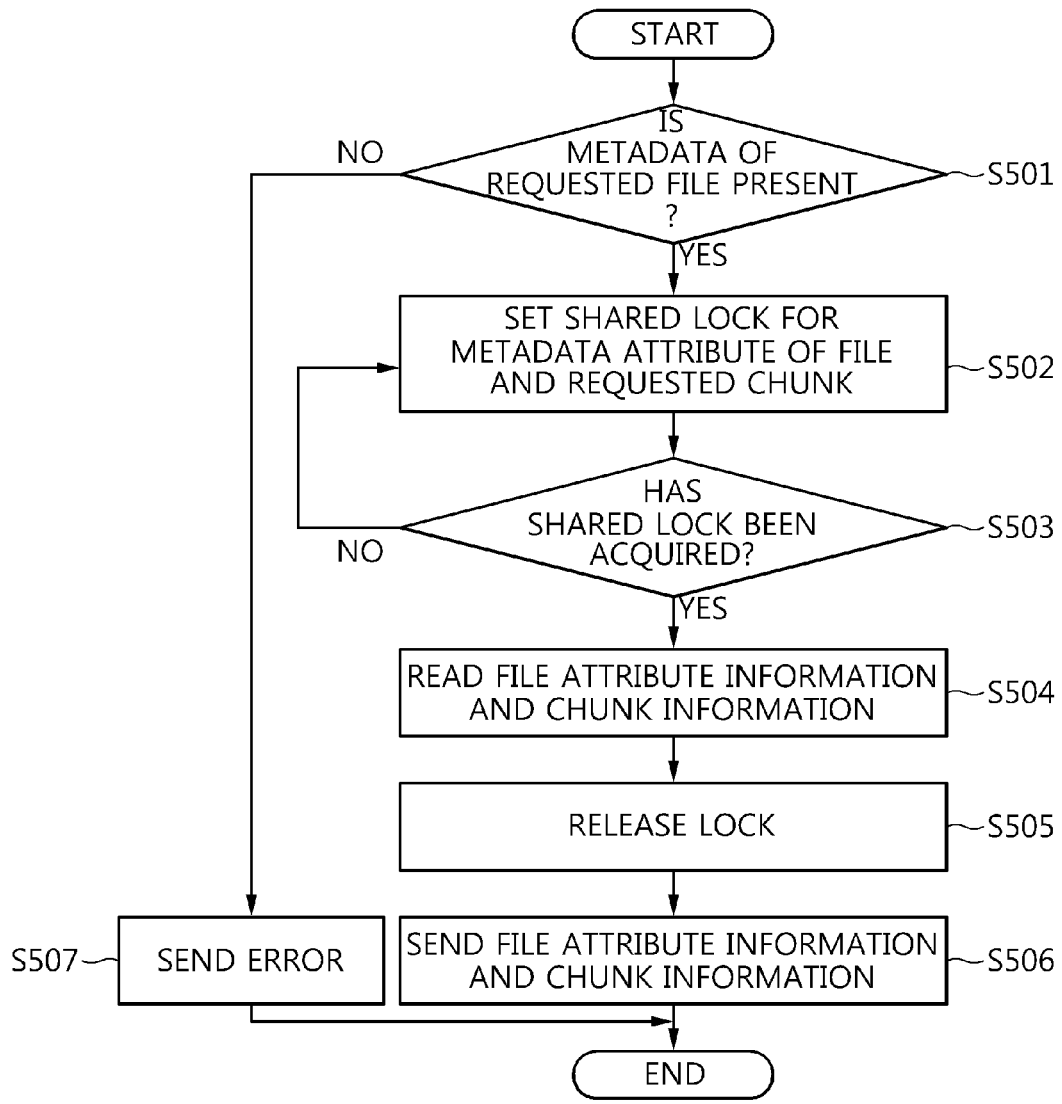
FIG. 5 is a flowchart illustrating a method by which a metadata server of the distributed file system processes a file read request from a client according to an embodiment of the present invention.

FIG. 5 is a flowchart illustrating a method by which a metadata server of the distributed file system processes a file read request from a client according to an embodiment of the present invention.

Referring to FIG. 5, when receiving a read request together with the chunk number of a file to be read from the client, the metadata server of the distributed file system according to an embodiment of the present invention determines whether the metadata information for the requested file is present at step S501.

If, as a result of the determination at step S501, it is determined that no metadata information is present, the metadata server sends an error to the client at step S507 because the read request corresponds to a read request for a non-present file or chunk, and terminates the processing of the read request.

If, as a result of the determination at step S501, it is determined that metadata information is present, the metadata server sets a shared lock for the file attribute information and the requested chunk in the metadata information for the file at step S502.

Thereafter, the metadata server determines whether the shared lock has been obtained at step S503. If, as a result of the determination at step S503, it is determined that the shared lock has not been acquired, the metadata server waits for a while because the file is being changed by another client, and then attempts to acquire the shared lock at step S502.

If, as a result of the determination at step S503, it is determined the shared lock has been acquired, the metadata server reads the file attribute information and the information of the requested chunk from the metadata information at step S504, releases the shared lock at step S505, and sends the file attribute information and the chunk information to the client at step S506.

Meanwhile, in an environment such as a virtual environment, a specific file system client exclusively uses a specific file at a specific point of time. A server host that executes a VM is a client of the file system which intensively accesses a VM image.

A VM independently uses a VM image mapped thereto, and thus a server host (i.e., a client of a file system) that executes the VM independently uses the VM image at a specific point of time. When the VM is undergoing live migration, a new server host independently uses the VM image, and the prior server host has stopped using the VM image. Accordingly, since in this environment, a file is not modified by another client, the methods described with reference to FIGS. 3 and 5 may be simplified in order to improve the performance of a file system.

Methods of simplifying the methods described with reference to FIGS. 3 and 5 will now be described with reference to FIGS. 6 and 7. The process described with reference to FIG. 4 will be omitted because it is less likely to be used in a virtual environment for the sake of improving performance. However, it will be apparent that those skilled in the art can easily deduce the case in which the process described with reference to FIG. 4 is used to improve performance in a virtual environment from the relationships between FIGS. 3, 6, and 4.

Figure 6:
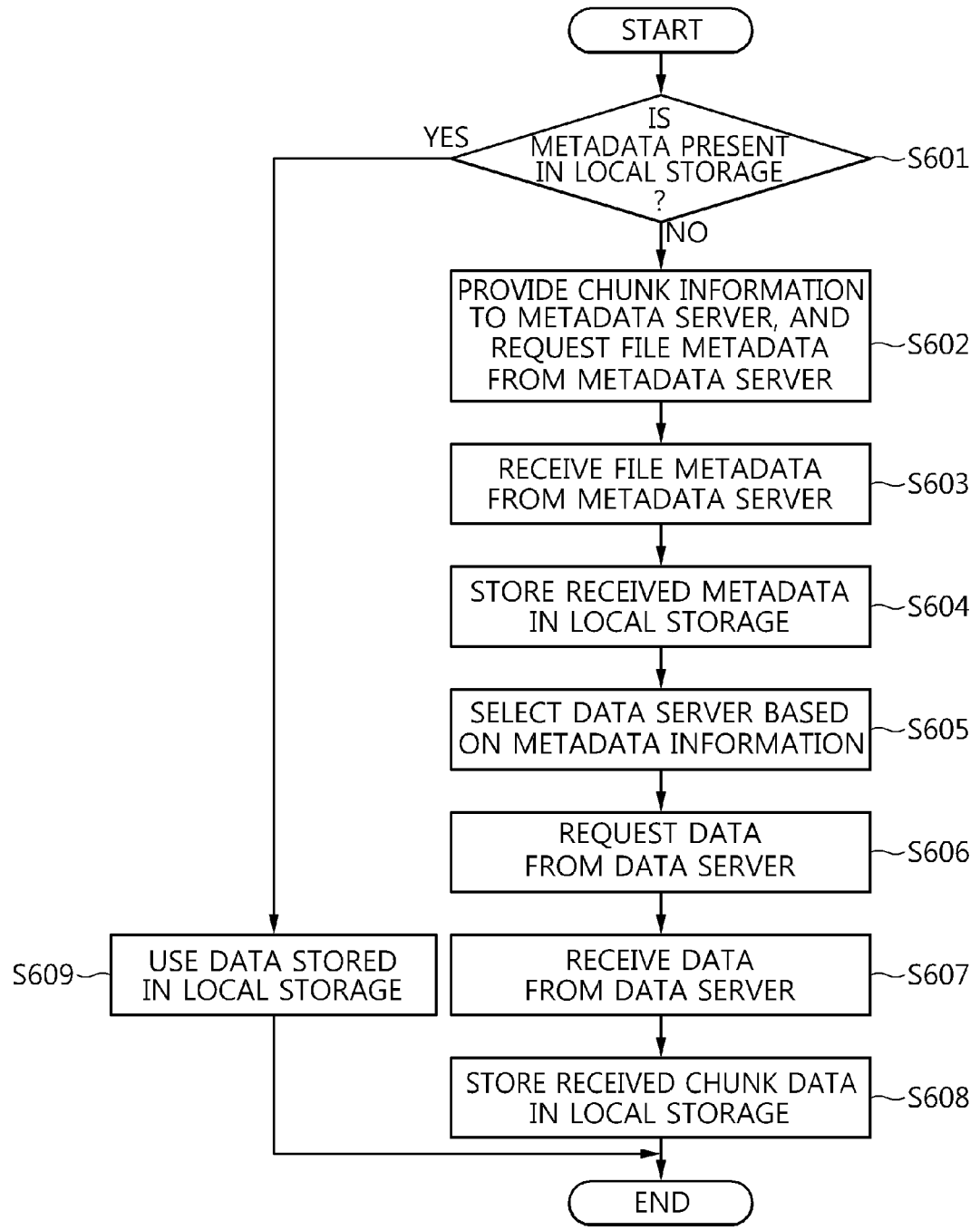
FIG. 6 is a flowchart illustrating a method by which a participation-type client reads a file in an environment in which a client exclusively uses a specific file similarly to in a virtual environment.

FIG. 6 is a flowchart illustrating a method by which a participation-type client reads a file in an environment in which a client exclusively uses a specific file like in a virtual environment.

Referring to FIG. 6, in an environment in which a client exclusively uses a specific file, the participation-type client determines whether the metadata information for a chunk of a file to be read has already been stored in its local storage at step S601.

If, as a result of the determination at step S601, it is determined that metadata information has already been stored in the local storage, this means that corresponding data has been stored in the local storage, and thus the participation-type client reads the file using the stored data at step S609.

If, as a result of the determination at step S601, it is determined that metadata information has not been stored in the local storage, this means that the chunk is first read, and thus the participation-type client provides the chunk number of the file to a metadata server in order to read the file, and requests the metadata information from the metadata server at step S602.

As a result of the response to the request at step S602, the participation-type client receives the metadata information (i.e., file attribute information and the chunk information of the chunk) from the metadata server at step S603.

After receiving the metadata information, the participation-type client stores the received metadata information (i.e., the file attribute information and the chunk information of the chunk) in the local storage at step S604.

Thereafter, the participation-type client selects a data server from which chunk data will be read based on the received metadata information at step S605, requests the chunk data from the selected data server at step S606, and then receives the chunk data from the selected data server at step S607. After receiving the chunk data, the participation-type client stores the received chunk data in the local storage and performs a read operation on the file using the stored chunk data at step S608.

Figure 7:
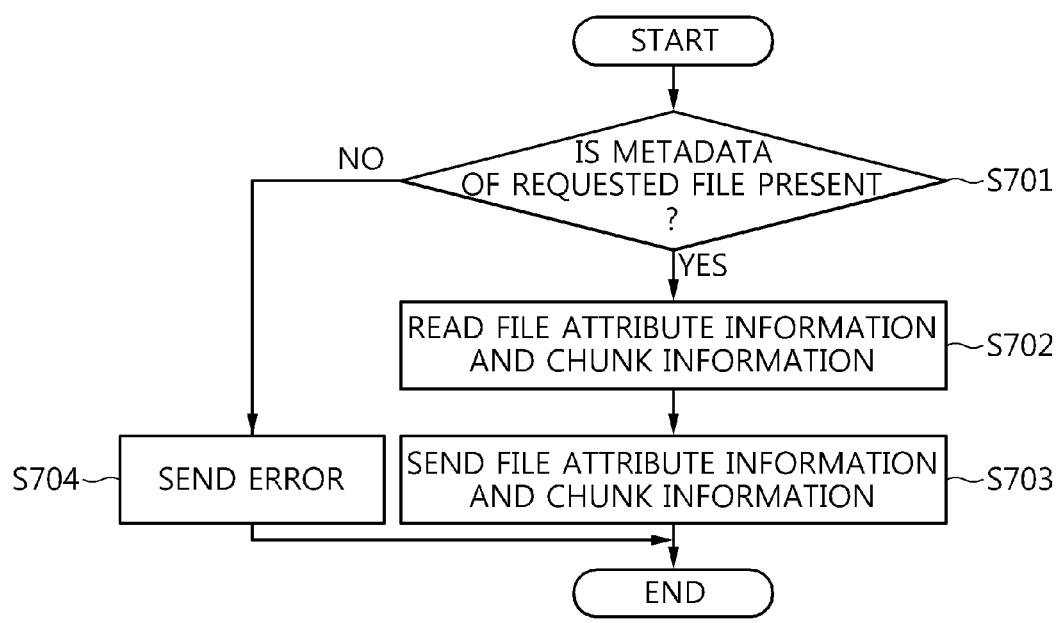
FIG. 7 is a flowchart illustrating a method by which a metadata server processes a file read request from a client in an environment in which a client exclusively uses a specific file similarly to in a virtual environment.

FIG. 7 is a flowchart illustrating a method by which a metadata server processes a file read request from a client in an environment in which a client exclusively uses a specific file similarly to in a virtual environment.

Referring to FIG. 7, when receiving a read request together with the chunk number of a file to be read from the client, the metadata server determines whether the metadata information for the requested file is present at step S701.

If, as a result of the determination at step S701, it is determined that no metadata information is present, the read request corresponds to a request for a non-present file or chunk, and then the metadata server sends an error to the client at step S704.

If, as a result of the determination at step S701, it is determined that the metadata information is present, the metadata server reads file attribute information and the information of the requested chunk from the metadata information at step S702, and sends the file attribute information and the chunk information to the client at step S703.

The read method and the read request processing method described with reference to FIGS. 6 and 7 can maximize performance by preventing a client and a metadata server from performing unnecessary operations in an environment in which a client exclusively uses a specific file similarly to in a virtual environment.

In the examples of FIGS. 6 and 7, a virtual environment in which a server host on which a VM is running operates as a client of a file system which intensively accesses a VM image has been chiefly described. However, the scope of the present invention is not limited to a virtual environment because a variety of similar environments are present in addition to the virtual environment.

Figure 8:
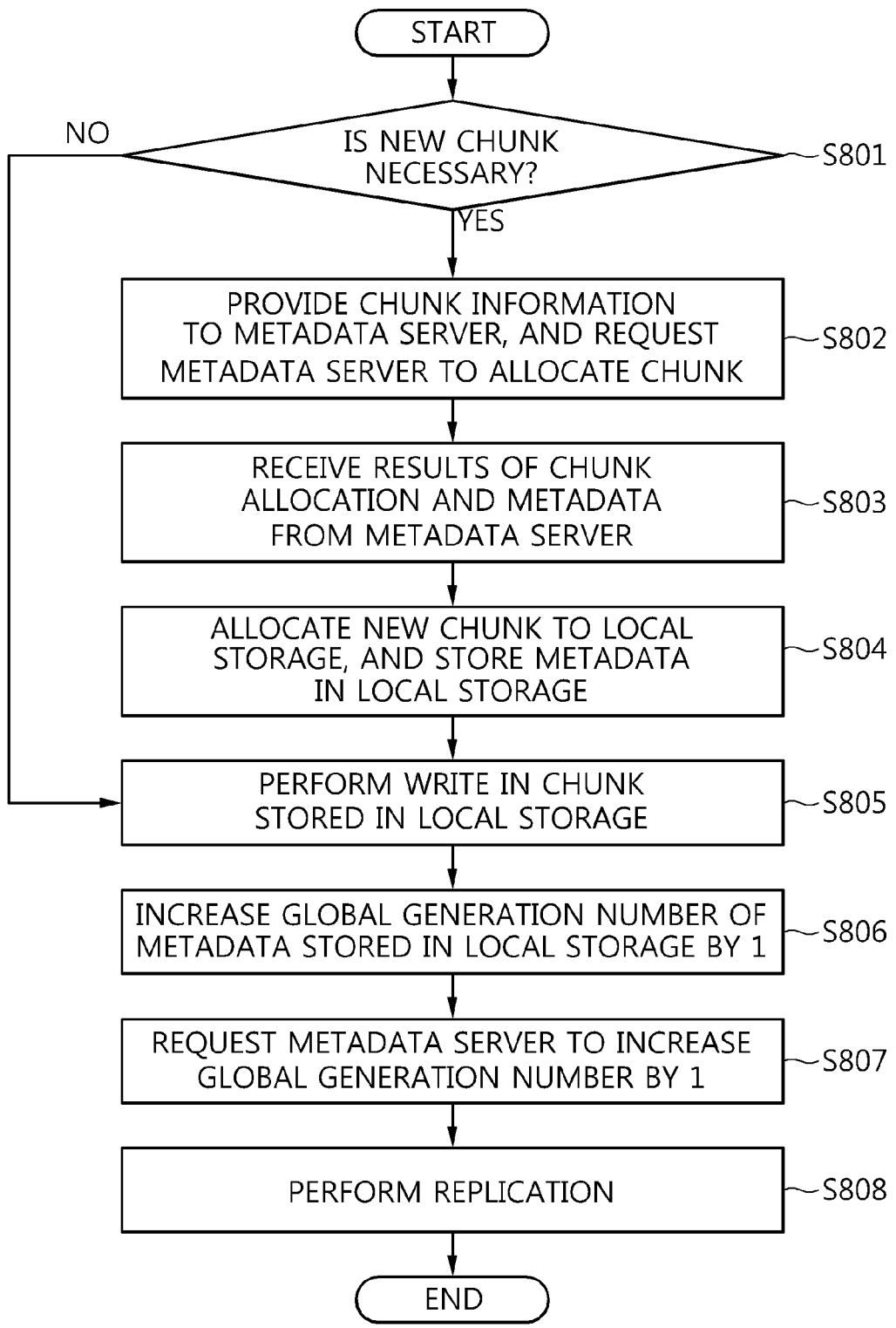
FIG. 8 is a flowchart illustrating a method by which a participation-type client of the distributed file system writes a file according to an embodiment of the present invention.

FIG. 8 is a flowchart illustrating a method by which a participation-type client of the distributed file system writes a file according to an embodiment of the present invention.

Referring to FIG. 8, the participation-type client of the distributed file system according to an embodiment of the present invention determines whether a new chunk is necessary in order to write a file at step S801.

If, as a result of the determination at step S801, it is determined that a new chunk is not necessary, the participation-type client writes data in a local chunk at step S805.

If, as a result of the determination at step S801, it is determined that a new chunk is necessary, the participation-type client provides a metadata server with information about a chunk in which data will be written (e.g., a chunk ID) and then requests the allocation of the chunk from the metadata server at step S802.

As a result of the response to the request at step S802, the participation-type client receives information about the results of the allocation of the chunk and the metadata information (i.e., file attribute information and the chunk information of the chunk) of a file from the metadata server at step S803.

After receiving the information about the results of the allocation and the metadata information, the participation-type client allocates the new chunk to its local storage and then stores the received metadata information in the local storage at step S804.

Thereafter, the participation-type client writes the requested data to the allocated local chunk at step S805.

After completing the writing, the participation-type client increases the global generation number of the modified chunk by 1 in order to provide notification that it has modified the chunk corresponding to the write at step S806 and requests the metadata server to increase the global generation number by 1 at step S807.

Thereafter, the participation-type client performs a data replication process in order to propagate the modification of the chunk to data servers in which the chunk has been stored at step S808.

The data replication at step S808 may be performed by either a synchronous method or an asynchronous method, and may be changed anytime by configuring a file system.

In the case of the synchronous method, a participation-type client directly requests a data write operation from the main data server of data servers. In this case, when the main data server receives the data write request, it performs the data write and consecutively replicates the data to the remaining data servers. In the case of the asynchronous method, a participation-type client operates a separate replication thread or replication process and then completes a file write. When a data write request is received, the data servers including the main data server perform a data write operation and request the metadata server to increase the generation number of the chunk. When the request to increase the generation number of the chunk is received, the metadata server incorporates the increased generation number of the chunk into metadata. Here, a change in the generation number of a chunk does not need to be incorporated into metadata stored in the local storage of a participation-type client. After the results of the data write request have been received from the data servers, the data servers request the metadata server to increase the generation number (e.g., 522-*z*-*i* of FIG. 2) of the chunk of the metadata of a corresponding file which corresponds to a corresponding data server.

A method by which a non-participation-type client writes a file may be easily deduced from the methods of FIGS. 3, 4 and 8, and thus a detailed description thereof will be omitted.

Furthermore, tasks performed by a metadata server via the file write operation of a client include the processing of a chunk allocation request and the processing of a request for the modification of the generation number of a chunk. These tasks are similar to those of the processing method described with reference to FIG. 5 except that an exclusive lock is used instead of the shared lock, and thus a detailed description thereof will be omitted.

A write process in an environment in which a specific client exclusively uses a specific file similarly to in a virtual environment and the processing process of a metadata server may be easily understood from the relationships between FIGS. 3 and 6 and FIGS. 5 and 7. The write process and the processing process of a metadata server will now be described in brief. In an environment in which a specific client exclusively uses a specific file, a lock does not need to be used every time a metadata server accesses metadata, the process of a client receiving metadata from a metadata server in order to check the validity of data stored in local storage is not necessary, and the process of comparing the global generation number of received metadata with the global generation number of metadata stored in local storage is also not necessary.

Meanwhile, a file creation operation is completed in such a way that a metadata server creates the file attribute information of a file and sends the created file attribute information to a client. In contrast, a file open operation is completed in such a way that a metadata server reads only the file attribute information and sends the read file attribute information to a client. Furthermore, a file close operation is completed in such a way that a client deletes metadata information and data information about a file. In the file creation, open, and close operations, if specific attribute information (e.g., the number of file open operations) is modified, a metadata server may modify the file attribute information of the metadata information.

A file delete operation is similar to the file write operation, and thus a detailed description thereof will be omitted.

Figure 9:
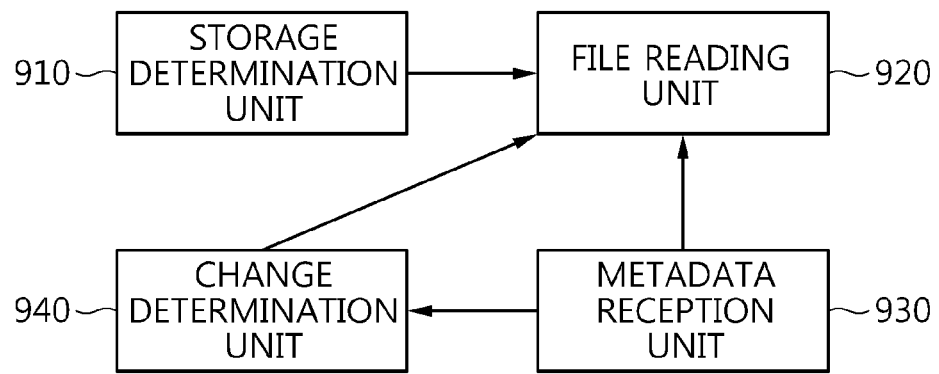
FIG. 9 is a block diagram showing a client device of the distributed file system according to an embodiment of the present invention.

FIG. 9 is a block diagram showing a client device of the distributed file system according to an embodiment of the present invention.

Referring to FIG. 9, the client device of the distributed file system according to the embodiment of the present invention includes a storage determination unit 910, a file reading unit 920, a metadata reception unit 930, and a change determination unit 940.

The storage determination unit 910 determines whether metadata information (i.e., first metadata information) including the global generation number of the chunk, corresponding to a file to be read, has already been stored in its local storage.

If, as a result of the determination, it is determined that the metadata information (i.e., the first metadata information) has already been stored in the local storage, the file reading unit 920 performs a read operation on the file using data that has been stored in the local storage and that corresponds to the metadata information (i.e., the first metadata information). In an embodiment, even when metadata information has been stored in local storage, a client device may read the metadata information from a metadata server, make a comparison (between the local stored metadata information and the metadata information read from a metadata server), and read a data from the local storage in case the result of the comparison is identical.

The metadata reception unit 930 receives metadata information (i.e., second metadata information), including the global generation numbers of the chunks, from the metadata server, and stores the received metadata information (i.e., the second metadata information) in the local storage.

In an embodiment, when, as a result of the determination of the storage determination unit 910, it is determined that the metadata information has not been stored, the metadata reception unit 930 may receive the metadata information from the metadata server. Even when the metadata information has already been stored in the local storage, the metadata reception unit 930 may receive the metadata information from the metadata server in order to determine whether the metadata information has been changed.

If the metadata reception unit 930 receives new metadata information from a metadata server, the client device may receive chunk data from a data server corresponding to the received metadata information, and perform a read operation on a file using the received chunk data. Here, even when metadata information is received from a metadata server, chunk data may not be received if a global generation number included in the received metadata information is identical with a global generation number included in previously stored metadata information.

The metadata information (i.e., the first metadata information and the second metadata information) may include file attribute information and chunk information about a chunk that belongs to the file. The file attribute information may include one or more of the size of the file, the size of the chunk, the number of replicas of the file, the owner of the file, and rights to access the file. The chunk information may include a chunk ID, a global generation number, and a chunk storage server list. The chunk storage server list may include a number of entries, while each entry has the data server ID of a data server in which the chunk is stored, a chunk location ID, and a generation number. Here, the generation numbers may be increased by 1 every time a corresponding chunk is changed.

The global generation number may correspond to the largest of the generation numbers corresponding to the data servers.

The change determination unit 940 compares the global generation number included in the metadata information (i.e., the first metadata information) previously stored in the local storage, with the global generation number included the metadata information (i.e., the second metadata information) received from the metadata server, and determines whether the chunk has been changed based on the results of the comparison.

If, as a result of the comparison, it is determined that the global generation number included in the metadata information (i.e., the first metadata information) previously stored in the local storage is identical with the global generation number included the metadata information (i.e., the second metadata information) received from the metadata server, the file reading unit 920 may perform a read operation on the file using data stored in the local storage. If, as a result of the determination of the storage determination unit 910, it is determined that the metadata information (i.e., the first metadata information) has not been stored or that the chunk has been changed because the global generation number included in the metadata information (i.e., the first metadata information) previously stored in the local storage is different from the global generation number included the metadata information (i.e., the second metadata information) received from the metadata server, the file reading unit 920 may select a data server from which the chunk data will be downloaded using the received metadata information (i.e., the second metadata information), receive the chunk data from the selected data server, and then perform a read operation on the file using the received chunk data.

Here, the data server from which chunk data will be downloaded may be selected from among only those data servers each of which has a generation number that is the same as the global generation number which is included in the metadata information (i.e., the second metadata information) received from the metadata server.

Although not shown in FIG. 9, the client device of the distributed file system may further include a chunk necessity determination unit, a chunk allocation request unit, a chunk allocation unit, a data writing unit, a local global number increasing unit, a global number increasing request unit, and a data replication unit in order to perform a data write operation.

The chunk necessity determination unit determines whether a new chunk is necessary before writing data.

If a new chunk needs to be allocated, the chunk allocation request unit requests a metadata server to allocate a new chunk.

The chunk allocation unit receives information about the results of the allocation of the new chunk and metadata information corresponding to the allocated chunk from the metadata server, allocates the new chunk to the local storage, and then stores the received metadata in the local storage.

The data writing unit writes data to the chunk allocated to the local storage.

The local global number increasing unit increases the global generation number of the chunk corresponding to the written data by 1, and stores the increased global generation number.

The global number increasing request unit requests the metadata server to increase the global generation number of metadata information corresponding to the written data by 1.

The data replication unit performs data replication corresponding to the write operation.

The data replication may be performed by the synchronous method or the asynchronous method as described above.

Figure 10:
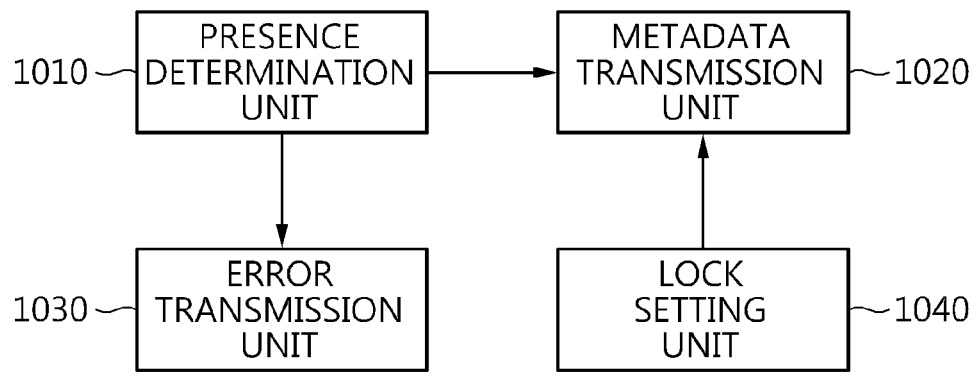
FIG. 10 is a block diagram showing the metadata server device of the distributed file system according to an embodiment of the present invention.

FIG. 10 is a block diagram showing a metadata server device of the distributed file system according to an embodiment of the present invention.

Referring to FIG. 10, the metadata server device of the distributed file system according to the embodiment of the present invention includes a presence determination unit 1010, a metadata transmission unit 1020, an error transmission unit 1030, and a lock setting unit 1040.

The presence determination unit 1010 determines whether the metadata information for chunks corresponding to a file on which a read or a write was requested is present.

If, as a result of the determination of the presence determination unit 1010, it is determined that metadata information is present, the metadata transmission unit 1020 sends file attribute information and chunk information, included in the metadata information, to a client.

The file attribute information may include one or more of the size of the file, the size of the chunk, the number of replicas of the file, the owner of the file, and rights to access the file.

The chunk information may include a chunk ID, a global generation number, and a chunk storage server list. The chunk storage server list may include a number of entries, while each entry has a data server ID, a chunk location ID, and the generation number of a data server storing the chunk. Here, the generation number may be increased by 1 every time the chunk is changed.

The global generation number may correspond to the largest of the generation numbers corresponding to the data servers.

If, as a result of the determination of the presence determination unit 1010, it is determined that no metadata information is present, the error transmission unit 1030 sends an error because the request is an erroneous one.

The lock setting unit 1040 sets a lock for the file attribute information and the chunk Here, the shared lock may be set in the case of a file read operation, and the exclusive lock may be set in the case of a file write operation.

If the condition in which a specific client exclusively uses a specific file has not been established, the metadata transmission unit 1020 can access the file attribute information and the chunk information only when the lock has been set by the lock setting unit 1040.

The metadata server device of FIG. 10 may correspond to a metadata server cluster including a plurality of metadata servers. Each of the plurality of metadata servers may manage only the metadata information that has been allocated thereto.

As described above, the apparatus and method for enabling clients to participate in data storage in the distributed file system according to the present invention are not limited and applied only to the constructions and methods according to the above-described embodiments, but part of or all the embodiments may be selectively combined with each other so that the embodiments may be modified in various ways.

According to the present invention, since a client participates in fulfilling the function of a data repository in the distributed file system, the client's access to the file system has a local disk access effect.

Furthermore, since a client participates in fulfilling the function of a data repository in the distributed file system, a degradation in the performance of access to storage occurring due to the increasing number of clients in the distributed file system can prevented.

Furthermore, when a client participates in fulfilling the function of a data repository in the distributed file system, the change history of a chunk may be tracked using the generation number of the chunk and a client attempting to access a chunk may access the correct chunk.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A client device of a distributed file system, comprising:
at least one hardware processor which provides:
a storage determination unit configured to determine whether first metadata information, including a global generation number of a chunk corresponding to a file to be read and a chunk storage server list of the chunk, has already been stored in local storage after receiving the first metadata information;
a file reading unit configured to perform a read operation on the file using local data corresponding to the first metadata information upon a determination by the storage determination unit that the first metadata information has already been stored; and
a metadata reception unit configured to receive second metadata information comprising the global generation number of the chunk and store the second metadata information in the local storage;
wherein upon a determination by the storage determination unit that the global generation number included in the first metadata information is identical with the global generation number included in the second metadata information, the file reading unit performs the read operation on the file using the local data corresponding to the first metadata information; and
upon a determination by the storage determination unit that the global generation number included in the first metadata information is different from the global generation number included in the second metadata information, the file reading unit determines that the chunk has been changed, receives the chunk data from one of the data servers corresponding to the second metadata information, and then performs the read operation on the file using the received chunk data.

2. The client device as set forth in claim 1,
wherein the file reading unit receives chunk data from a data server corresponding to the second metadata information, and performs the read operation on the file using the received chunk data.

3. The client device as set forth in claim 2, wherein each of the first metadata information and the second metadata information comprises:
file attribute information comprising one or more of a size of the file, a size of the chunk, a number of replicas of the file, an owner of the file, and rights to access the file; and
chunk information about the chunk that belongs to the file.

4. The client device as set forth in claim 3, wherein:
the chunk information comprises a chunk ID, the global generation number, and the chunk storage server list;
the chunk storage server list comprises a plurality of entries, wherein each entry among the plurality of entries has a data server ID of each data server storing the chunk, and a chunk location ID in the data server, and a generation number of the chunk; and
the generation number is increased by 1 every time the chunk corresponding to the generation number is changed.

5. The client device as set forth in claim 4, wherein the global generation number corresponds to a largest of generation numbers corresponding to the each data server.

6. The client device as set forth in claim 5, wherein the at least one hardware processor further provides:
a change determination unit configured to compare the global generation number included in the first metadata information with the global generation number included in the second metadata information and to determine whether the chunk has been changed based on results of the comparison.

7. The client device as set forth in claim 6, wherein the data server corresponding to the second metadata information corresponds to a generation number identical with the global generation number included in the second metadata information.

8. The client device as set forth in claim 1, wherein the at least one hardware processor further provides:
a data writing unit configured to write data to a local chunk;
a local global number increasing unit configured to increase a global generation number of the local chunk, corresponding to the data, by 1 and to store the increased global generation number;
a global number increasing request unit configured to request a metadata server to increase the global generation number of the metadata information, corresponding to the data, by 1; and
a data replication unit configured to perform data replication corresponding to the writing.

9. The client device as set forth in claim 8, wherein the at least one hardware processor further provides:
a chunk necessity determination unit configured to determine whether a new chunk is necessary before writing the data;
a chunk allocation request unit configured to request the metadata server to allocate a chunk upon a determination by the chunk necessity determination unit that the new chunk is necessary; and
a chunk allocation unit configured to receive information about results of the allocation of the new chunk and metadata information corresponding to the allocated chunk from the metadata server, to allocate the new chunk to the local storage, and to store the received metadata information.

10. A metadata server device of a distributed file system, comprising:
    at least one hardware processor which provides:
        a presence determination unit configured to determine whether metadata information for a chunk corresponding to a file on which a read was requested is present after receiving the metadata information; and
        a metadata transmission unit configured to send file attribute information and chunk information included in the metadata information upon a determination by the presence determination unit that metadata information is present;
        wherein the file attribute information comprises one or more of a size of the file, a size of the chunk, a number of replicas of the file, an owner of the file, and rights to access the file, and
        wherein the chunk information comprises a chunk storage server list; and
        wherein upon a determination by the presence determination unit that the global generation number included in the first metadata information is identical with a global generation number included in a second metadata information, the metadata transmission unit performs the read operation on the file corresponding to the first metadata information; and
        wherein upon a determination by the presence determination unit that the global generation number included in the first metadata information is different from the global generation number included in the second metadata information, the metadata transmission unit determines that the chunk has been changed, receives the chunk data corresponding to the second metadata information, and then performs the read operation on the file using the received chunk data.

11. The metadata server device as set forth in claim 10, wherein:
    the chunk information comprises a chunk ID, a global generation number, and the chunk storage server list;
    the chunk storage server list comprises a plurality of entries, while each entry among the plurality of entries has a data server ID of each data server storing the chunk, a chunk location ID in the data server, and a generation number of the chunk; and
    the generation number is increased by 1 every time the chunk corresponding to the generation number is changed.

12. The metadata server device as set forth in claim 11, wherein the at least one hardware processor further provides:
    an error transmission unit configured to send an error upon a determination by the presence determination unit that no metadata information is present; and
    a lock setting unit configured to set a lock for the file attribute information and the chunk;
    wherein the metadata transmission unit accesses the file attribute information and the chunk information only when the lock has been set.

13. The metadata server device as set forth in claim 12, wherein the global generation number corresponds to a largest of generation numbers corresponding to the each data server.

14. The metadata server device as set forth in claim 13, wherein:
    the metadata server device corresponds to a metadata server cluster including a plurality of the metadata servers; and
    each of the plurality of metadata servers manages only metadata information allocated thereto.

15. A method of a client of a distributed file system reading a file, the method comprising:
    determining whether first metadata information, comprising a global generation number of a chunk corresponding to the file and a chunk storage server list of the chunk, has already been stored in local storage after receiving the first metadata information;
    performing a read operation on the file using local data corresponding to the first metadata information upon a determination that the first metadata information has already been stored; and
    receiving second metadata information comprising the global generation number of the chunk and storing the second metadata information in the local storage;
    wherein upon a determination that the global generation number included in the first metadata information is identical with the global generation number included in the second metadata information, performing the read operation on the file using the local data corresponding to the first metadata information; and
    upon a determination that the global generation number included in the first metadata information is different from the global generation number included in the second metadata information, determining that the chunk has been changed, receiving the chunk data corresponding to the second metadata information, and then performing the read operation on the file using the received chunk data.

16. The method as set forth in claim 15,
    wherein the performing the read operation on the file comprises receiving chunk data from one of the data servers corresponding to the second metadata information and performing the read operation on the file using the received chunk data.

17. The method as set forth in claim 16, wherein each of the first metadata information and the second metadata information comprises:
    file attribute information comprising one or more of a size of the file, a size of the chunk, a number of replicas of the file, an owner of the file, and rights to access the file; and
    the chunk information of the chunk that belongs to the file.

18. A method of a metadata server device of a distributed file system processing a read request, comprising:
    determining whether metadata information for a chunk corresponding to a file on which a read operation was requested is present after receiving the metadata information; and
    sending file attribute information and chunk information included in the metadata information upon a determination that metadata information is present;
    wherein the file attribute information comprises one or more of a size of the file, a size of the chunk, a number of replicas of the file, an owner of the file, and rights to access the file,
    wherein the chunk information comprises a chunk storage server list; and
    wherein upon a determination that the global generation number included in the first metadata information is identical with a global generation number included in a second metadata information, performing the read operation on the file corresponding to the first metadata information; and
    wherein upon a determination that the global generation number included in the first metadata information is different from the global generation number included in the second metadata information, determining that the chunk has been changed, receiving the chunk data corresponding to the second metadata information, and then performing the read operation on the file using the received chunk data.

19. The method as set forth in claim 18, wherein:

the chunk information further comprises a chunk ID and a global generation number;

the chunk storage server list comprises a plurality of entries, while each entry among the plurality of entries has a data server ID of a data server storing the chunk, a chunk location ID in the data server, and a generation number of the chunk; and the generation number is increased by 1 every time the chunk corresponding to the generation number is changed.

* * * * *